United States Patent [19]

Towle

[11] Patent Number: 5,138,263
[45] Date of Patent: Aug. 11, 1992

[54] ELECTROMAGNETIC FORMATION EVALUATION TOOL

[75] Inventor: Jonathan Towle, East Windsor, Conn.

[73] Assignee: Teleco Oilfield Services Inc., Meriden, Conn.

[21] Appl. No.: 641,690

[22] Filed: Jan. 16, 1991

[51] Int. Cl.⁵ .................. G01V 3/12; G01V 3/30; H01Q 7/06
[52] U.S. Cl. .................. 324/338; 343/788; 324/334; 324/337
[58] Field of Search ............... 343/719, 788, 741, 745; 324/338, 333, 334–344

[56] References Cited

U.S. PATENT DOCUMENTS

| | | | |
|---|---|---|---|
| 977,462 | 12/1910 | Matthews | 343/788 |
| 3,377,549 | 4/1968 | Newman et al. | 324/342 |
| 4,107,597 | 8/1978 | Meador et al. | 324/341 |
| 4,739,325 | 4/1988 | MacLeod | 324/342 X |
| 4,994,747 | 2/1991 | Stolarczyk | 324/338 X |

*Primary Examiner*—Kenneth A. Wieder
*Assistant Examiner*—Warren S. Edmonds
*Attorney, Agent, or Firm*—Fishman, Dionne & Cantor

[57] ABSTRACT

A tool for evaluating electrical properties of an earth formation surrounding a borehole while drilling the borehole is disclosed. The tool includes a housing for connecting upper and lower portions of a drillstring, a transmit antenna for generating electromagnetic waves at least two receiving antennas for receiving electromagnetic waves and magnetic elements associated with each of the antennas for electromagnetically coupling each of the antennas with the formation. The tool provides improved transmit efficiency and improved receiving sensitivity.

22 Claims, 4 Drawing Sheets

ELECTROMAGNETIC FORMATION EVALUATION TOOL

TECHNICAL FIELD

The present invention relates to tools for evaluating electrical properties of an earth formation surrounding a borehole, and more particularly to electromagnetic wave propagation based tools for measuring formation resistivity conveyed by drillpipe.

BACKGROUND OF THE INVENTION

Conventional electromagnetic propagation based tools for measurement of formation resistivity while drilling typically include a cylindrical tool body, which forms a portion of the drillstring, and at least one transmit antenna and a pair of receive antennas mounted within the tool body. The antennas are typically electrostatically shielded wire loops that circumferentially surround the tool body and are mounted in circumferential grooves defined in the surface of the tool body. The tool employs magnetic dipoles operating in the MF and HF regions. The transmit antenna generates electromagnetic waves which are propagated through the formation surrounding the borehole. The waves are detected as they pass the respective receive antennas. The signal detected at the further of the two receive antennas is shifted in phase from and lower in amplitude than the signal detected at the closer of the two receive antennas. Formation resistivities are derived from the phase difference and amplitude ratio of the signals detected. The differential measurement is primarily indicative of the properties of the region of the formation surrounding the receivers and is less sensitive to other regions of the formation and to variations in the transmitted signal.

A shortcoming of conventional measurement-while-drilling (MWD) formation evaluation tools is low efficiency of the antennas due to dominance of the electromagnetic field by the tool body.

SUMMARY OF THE INVENTION

A formation evaluation tool is disclosed. The tool includes a cylindrical housing having a circumferential groove defined in the outer diametral surface of the housing and an electrostatically shielded antenna loop circumferentially surrounding the housing and secured within the groove. The tool further includes magnetic means for electromagnetically coupling the antenna loop and the formation.

In a preferred embodiment, the antenna loop is a transmitting antenna and the magnetic means directs the electromagnetic induction field of the antenna loop outwardly from the tool housing and into the formation to improve the transmit efficiency of the antenna.

In a second preferred embodiment, the antenna antenna loop and the magnetic means directs an electromagnetic induction field between said antenna loop and said tool housing to improve the receive sensitivity of the antenna loop.

In a preferred embodiment, the magnetic means comprises a plurality of circumferentially spaced apart magnetic elements disposed in said groove between said antenna loop and said tool housing. Each of the magnetic elements is a "C"-shaped element having a curvilinear body extending from a first end to a second end. The first and second ends are oriented radially outwardly from said tool.

In a preferred embodiment, the magnetic elements comprises powdered iron or ferrite elements having a relative magnetic permeability between about 10 and about 20.

In a preferred embodiment, the tool includes a metallic shell circumferentially surrounding the elastomeric means to protect the elastomeric means from abrasion. The shell defines a plurality of circumferentially spaced apart longitudinally extending slots. Each of the slots is aligned with one of the magnetic elements.

DETAILED DESCRIPTION OF THE INVENTION

Figure 1:
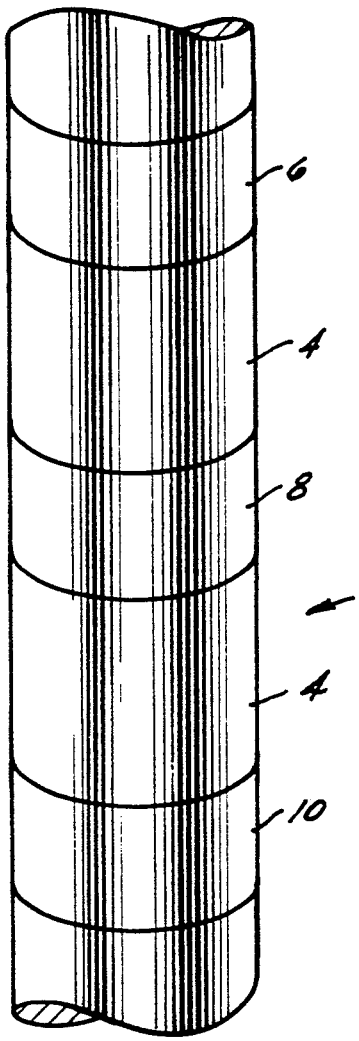
FIG. 1 shows a perspective view of a borehole evaluation tool.

Referring to FIG. 1, a borehole formation evaluation tool 2 includes a tool body 4, a transmitting antenna 6, a first receiving antenna 8 and a second receiving antenna 10.

Figure 3:
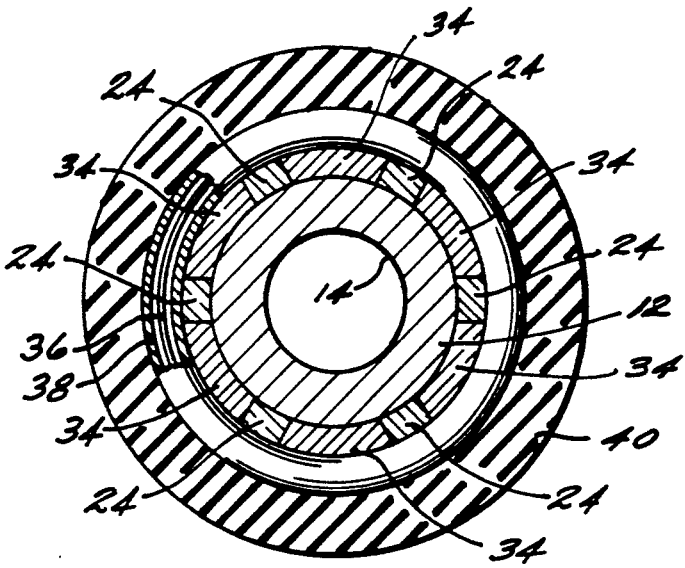
FIG. 3 shows a transverse cross sectional view taken along line 3—3 in FIG. 2.
Figure 2:
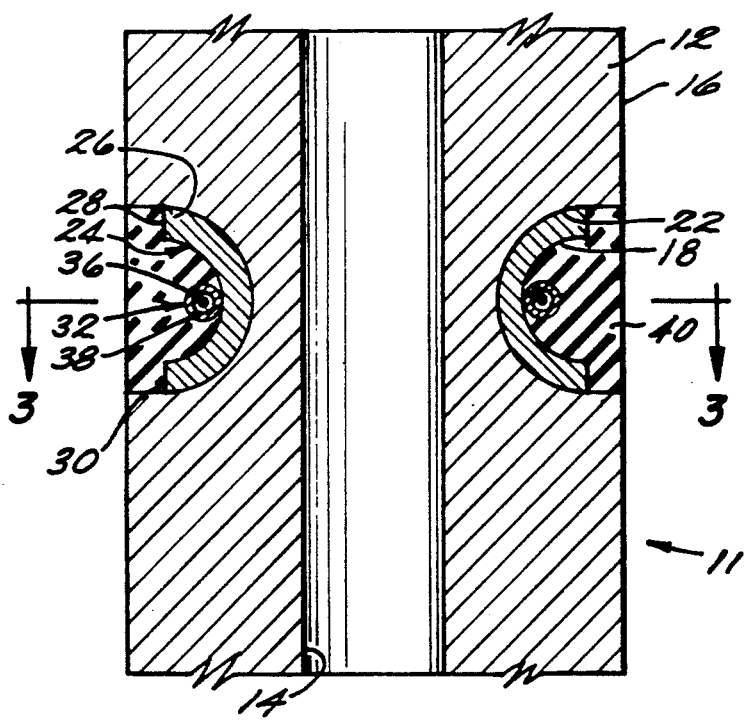
FIG. 2 shows a longitudinal cross sectional view of an embodiment of the tool of the present invention.

Referring to FIGS. 2 and 3, a tool 11 of the present invention includes a longitudinally extending cylindrical housing 12. The housing 12 has an inner diametral surface 14 defining a longitudinal bore through the housing and has an outer diametral surface 16. A circumferential groove 18 is defined in the outer diametral surface 16.

Six magnetic elements 24 are secured within groove 18. Each of the magnetic elements 24 is C-shaped and has a curvilinear body 26 extending from a first end 28 to a second end 30. Each of the magnetic elements 24 is oriented so that the first and second ends 28, 30 are longitudinally aligned with the rotational axis of the tool housing 12 and face radially outwardly from the housing 12.

The magnetic elements 24 may comprise an material having a relative magnetic permeability of about 10 or greater. Preferably, the magnetic elements 24 comprise powdered iron or ferrite. Most preferably, the magnetic elements 24 comprise powdered iron magnetic elements having a relative magnetic permeability between about 10 and about 20.

An antenna loop 32 circumferentially surrounds housing 12 and is secured with the circumferential groove 18 by supports 34. The antenna loop 32 may comprise a single turn of wire or multiple turns of wire. Preferably, the antenna loop comprises a wire element 36 within a tubular electrostatic shield 38. Preferably, the electrostatic shield 38 comprises a beryllium copper alloy.

An elastomer layer 40 fills circumferential groove 18, is bonded to the housing 12 and surrounds the antenna loop 32 and magnetic elements 24 to protect the antenna loop 32 and magnetic elements 24 from impact and moisture. Preferably, the elastomeric layer comprises a nitrile rubber composition.

Figure 5:
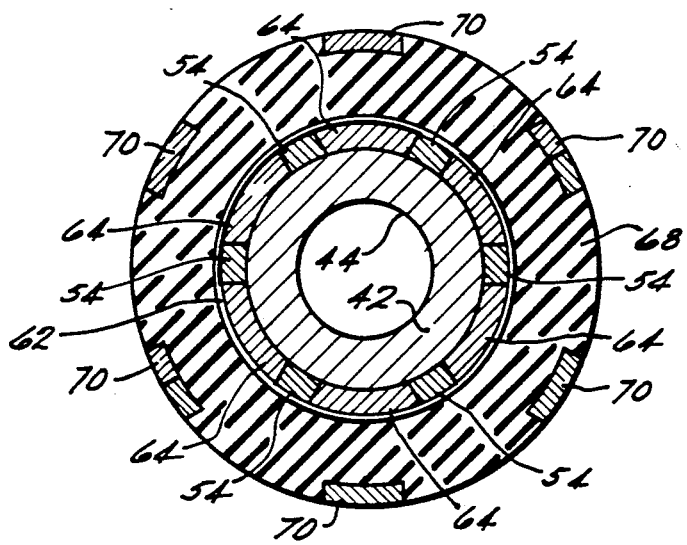
FIG. 5 shows a transverse cross sectional view taken along line 5—5 of FIG. 4.
Figure 4:
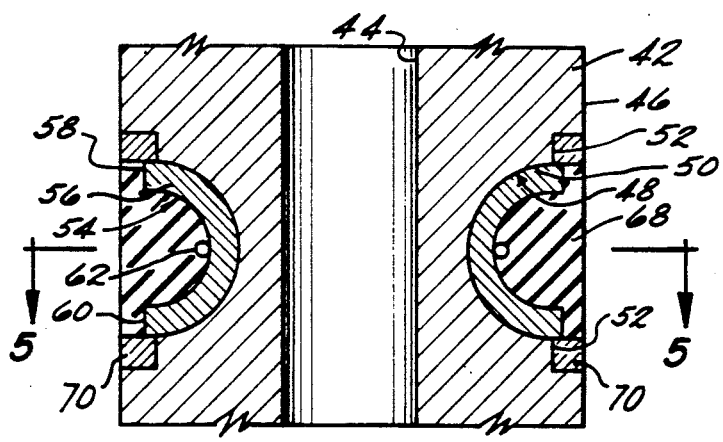
FIG. 4 shows a longitudinal cross sectional view of a second embodiment of the tool of the present invention.
Figure 6:
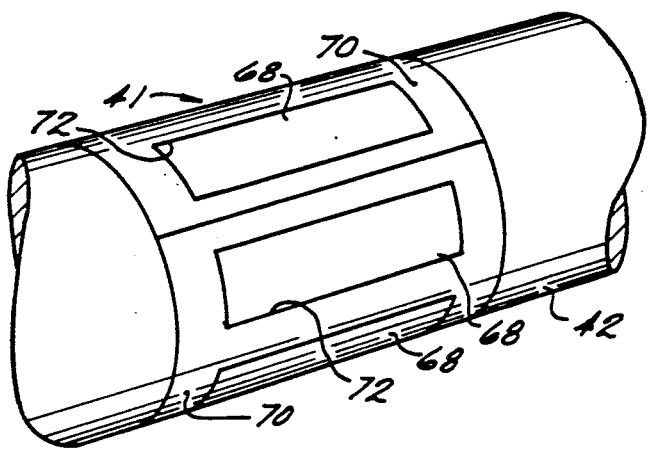
FIG. 6 shows perspective view of the embodiment shown in FIGS. 4 and 5.

FIGS. 4, 5 and 6 show an alternative embodiment 41 of the tool of the present invention. The tool 41 includes a cylindrical housing 42. The housing 42 has an inner diametral surface 44 defining a central bore with the housing and an outer diametral surface 46. A circumferential groove 48 is defined in the outer diametral surface 46. The groove 48 includes a central toric portion 50 and a pair of peripheral shoulder portions 52 defined on opposite sides of the toric portion 50.

Six magnetic elements 54 are secured within the central toric portion 50 of groove 48. Each of the magnetic elements 54 is C-shaped and has a curvilinear body 56 extending from a first end 58 to a second end 60. Each of the elements 54 is oriented so that the first and second ends 58, 60 are longitudinally aligned with the rotational axis of the housing 42 and face radially outwardly from housing 42. As in the embodiment discussed above, the magnetic elements 50 may be any material having a relative magnetic permeability of about 10 or greater. Preferably, the magnetic elements 54 comprise a powdered iron material having relative magnetic permeability between about 10 and about 20.

An antenna loop 62 circumferentially surrounds housing 42 and is secured with the circumferential groove 48 by supports 64.

An insulating layer 68 fills the circumferential groove 48, is bonded to the housing 42 and surrounds antenna loop 62 and magnetic elements 54 to protect the antenna loop 62 and magnetic elements 54 from impact and moisture.

The embodiment shown in FIGS. 4, 5 and 6 further comprises a metal shell 70 surrounding the insulating layer 58 to protect the insulating layer 68 and underlying antenna loop 62 and magnetic elements 54 from abrasion. The shell 70 includes a plurality of circumferentially spaced apart longitudinal slots 72. Each of the magnetic elements 54 is radially and longitudinally aligned with a slot 72 so that the ends 58, 60 of the element 54 are not obstructed by the shell 70. The shell 70 protects the elastomeric layer 68 from abrasion and tearing and functions as an electrostatic shield for antenna loop 62.

Figure 8:
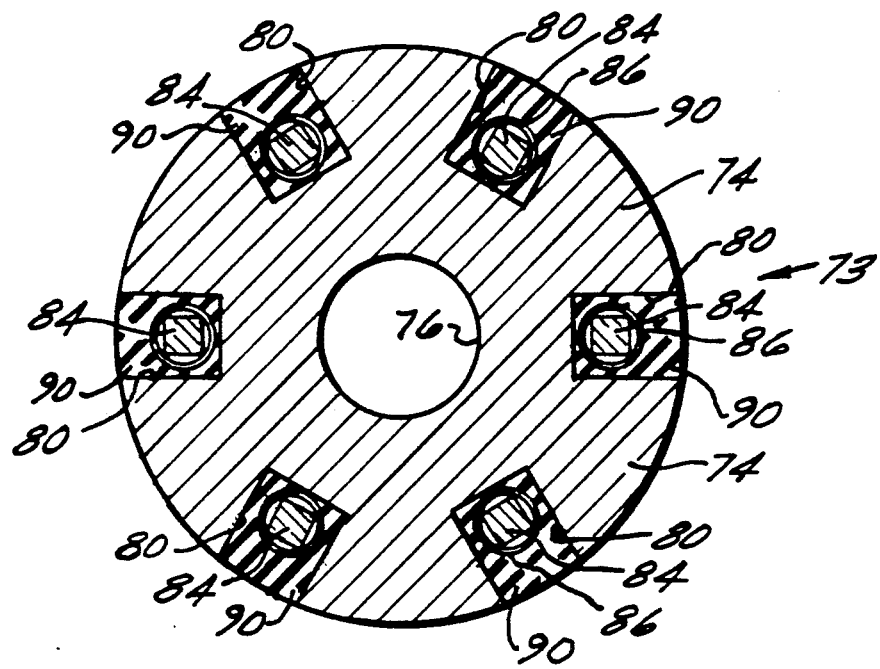
FIG. 8 shows a transverse cross sectional view taken along line 8—8 in FIG. 7.
Figure 7:
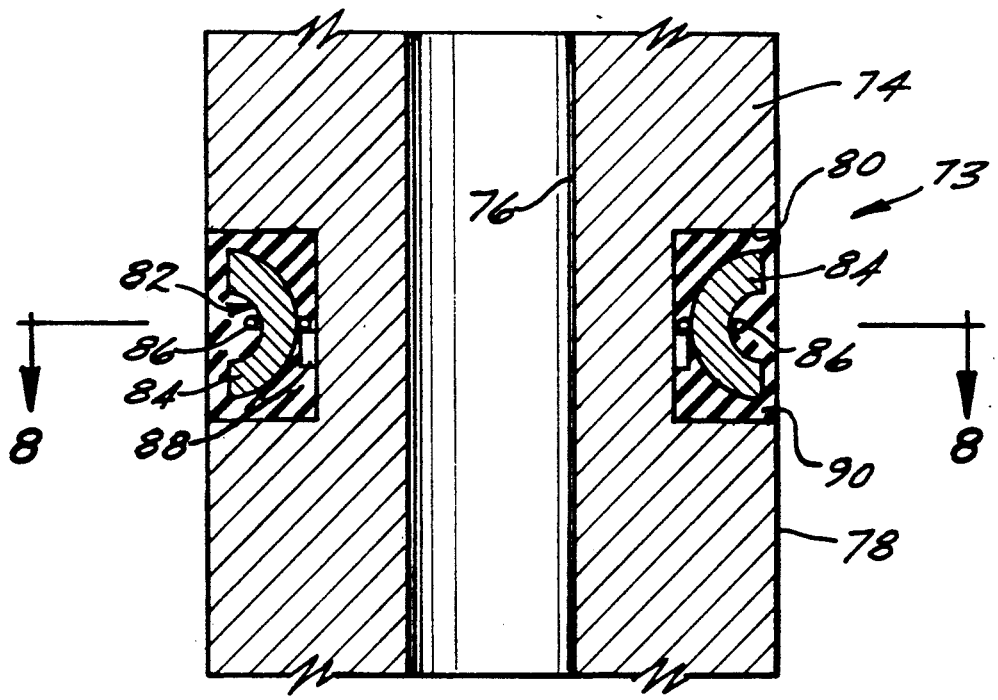
FIG. 7 shows a longitudinal cross sectional view of a third embodiment of the tool of the present invention.

An alternative embodiment 73 of the present invention is shown in FIGS. 7 and 8. The tool 73 includes a longitudinally extending cylindrical housing 74. The housing has an inner diametral surface 76 defining a longitudinal bore through the housing and has an outer diametral surface 78. Six longitudinally extending, circumferentially spaced apart, radially oriented grooves 80 are defined in the housing 74 and communicate with the outer diametral surface 78. An antenna assembly 82 is disposed in each groove 80. Each assembly 82 includes a magnetic element 84, an antenna 86 formed by several turns of wire wrapped around each magnetic element 84 and a resonating capacitor 88.

An insulating elastomer 90 fills the groove 80, is bonded to housing 74 and surrounds the antenna assembly 82 to protect the antenna assembly 82 from impact, vibration and moisture.

EXAMPLE

Figure 10:
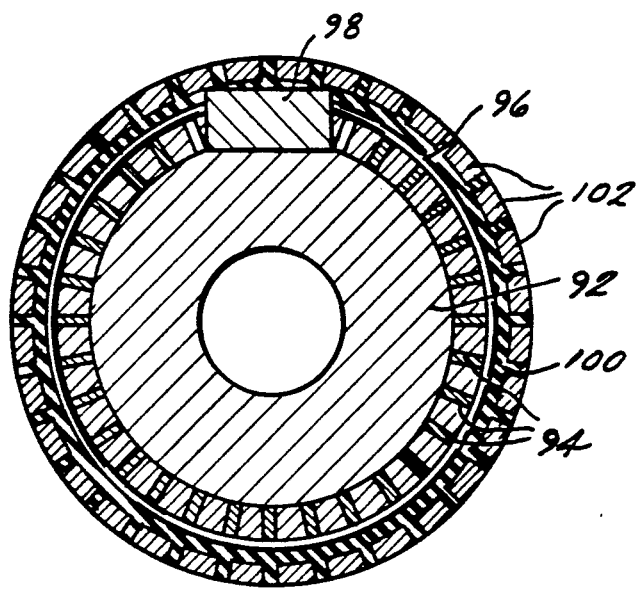
FIG. 10 shows a transverse cross sectional view taken along line 10—10 in FIG. 9.
Figure 9:
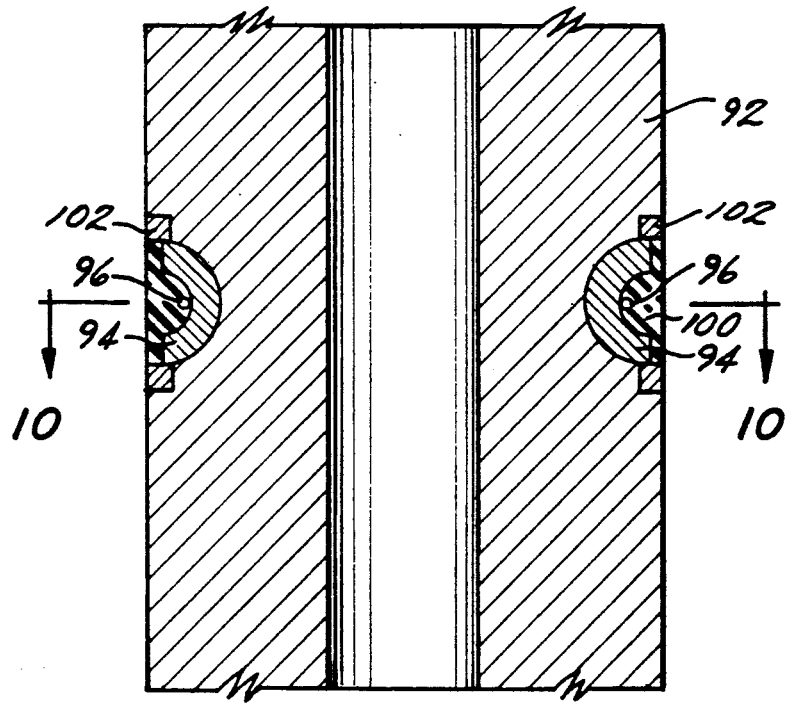
FIG. 9 shows a longitudinal cross sectional view of a fourth embodiment of the tool of the present invention.

An evaluation tool of the present invention was constructed by modifying one of the receive antennas of a conventional evaluation tool. The modified antenna assembly is shown in FIGS. 9 and 10. The antenna assembly includes a housing 92, magnetic elements 94, an antenna loop 96, an antenna junction box 98, an elastomeric layer 100 and a metal shield 102. The magnetic elements comprised powdered iron elements having a magnetic permeability of about 20. The antenna was a single turn of braided copper wire.

Performance of the modified receive antenna assembly 92 was compared to that of a conventional receive antenna assembly by measuring the path loss between a conventional transmit antenna and the modified receive antenna and comparing the results to those obtained with a conventional transmit antenna and a conventional receive antenna.

The antenna assembly of the present invention provided an increase in signal level of about 3 dB compared to the conventional antenna and approximately 11 dB over an antenna using the metal shield but without the powered iron segments.

The antenna may be a transmitting antenna or a receiving antenna. The magnetic elements direct the electromagnetic induction field generated by a transmit antenna outwardly from the tool housing and into the formation to improve the transmit efficiency of the transmitting antenna. The magnetic elements direct the electromagnetic induction field from the formation between a receive antenna loop and the housing to improve the receive sensitivity of the receive antenna.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A measurement-while-drilling tool for evaluating electrical properties of an earth formation surrounding a borehole, comprising:
    a housing, said housing connecting upper and lower portions of a drillstring;
    antenna means, associated with said housing, for electromagnetically interacting with the earth formation;
    magnetic means for electromagnetically coupling said antenna means and the earth formation, said magnetic means being disposed between said antenna means and said housing.

2. The tool of claim 1 wherein the antenna means comprises transmitting antenna means for generating electromagnetic waves.

3. The tool of claim 2, wherein the magnetic means directs the electromagnetic waves outwardly from the housing means and into the formation.

4. The tool of claim 1, wherein the antenna means comprises receiving antenna means for receiving electromagnetic waves.

5. The tool of claim 4, wherein the magnetic means directs the electromagnetic waves between said antenna means and said housing means.

6. The tool of claim 2, wherein the housing means comprises a cylindrical housing having an outer diametral surface and a circumferential groove defined in the outer diametral surface.

7. The tool of claim 6, wherein the antenna means comprises an antenna loop circumferentially surrounding said cylindrical housing and secured within said circumferential groove.

8. The tool of claim 7, wherein the magnetic means comprises a plurality of circumferentially spaced apart magnetic elements disposed within said groove between said antenna loop and said circumferential housing.

9. The tool of claim 8, wherein each of the magnetic elements comprises a "C"-shaped magnetic element having a curvilinear body extending from a first end to a second end and wherein said first and second ends are oriented radially outwardly from said groove.

10. The tool of claim 8, wherein the magnetic elements comprise powdered iron magnetic elements or ferrite magnetic elements.

11. The tool of claim 8, wherein each of the magnetic elements comprises a magnetic material having a relative magnetic permeability of about 10 or greater.

12. The tool of claim 11, wherein the magnetic material comprises a magnetic material having a relative magnetic permeability between about 10 and about 20.

13. The tool of claim 9, further comprising elastomeric means, bonded within said groove, for protecting the antenna loop and magnetic elements from impact and moisture.

14. The tool of claim 13, further comprising:
shell means, circumferentially surrounding said elastomeric means and secured to said cylindrical housing, for protecting said elastomeric means from abrasion.

15. The tool of claim 14, wherein the shell means comprises a metal, and the shell means provides an electrostatic shield for the antenna means.

16. The tool of claim 15, wherein the shell means defines a plurality of circumferentially spaced apart longitudinally extending slots and wherein each of the slots is radially and longitudinally aligned with one of the magnetic elements.

17. The tool of claim 1, wherein the housing means comprises a cylindrical housing having an outer diametral surface and having a plurality of circumferentially spaced apart longitudinally extending slots defined in the outer surface.

18. The tool of claim 17, wherein the antenna means comprises a plurality of antenna elements, wherein the magnetic means comprises a plurality of magnetic elements and wherein one of the antenna elements and one of the magnetic elements are disposed in each of the slots.

19. The tool of claim 18, wherein each of the magnetic elements comprises a "C"-shaped magnetic element having a curvilinear body extending from a first end to a second end and wherein said first and second ends are longitudinally aligned within the slot and are oriented radially outwardly from said slot.

20. The tool of claim 18, wherein the magnetic elements comprise powdered iron magnetic elements or ferrite magnetic elements.

21. The tool of claim 19, wherein each of the magnetic elements comprises a magnetic material having a relative magnetic permeability of about 10 or greater.

22. The tool of claim 18, further comprising elastomeric means, bonded within said slot, for protecting the antenna loop and magnetic elements from impact and moisture.

* * * * *

UNITED STATES PATENT AND TRADEMARK OFFICE
CERTIFICATE OF CORRECTION

PATENT NO. : 5,138,263

DATED : August 11, 1992

INVENTORS : Jonathan Towle

It is certified that error appears in the above-identified patent and that said Letters Patent is hereby corrected as shown below:

Title Page:
Abstract, line 5, Insert --,-- after "waves".

Col. 1, line 58 Delete "antenna", second occurrence.

Col. 2, line 57, Delete "an" and insert therefor --a--.

Col. 4, line 24, Delete "powered" and insert therefor --powdered--.

Signed and Sealed this

First Day of March, 1994

BRUCE LEHMAN

Attest:

Attesting Officer     Commissioner of Patents and Trademarks